United States Patent
Luo et al.

(10) Patent No.: US 10,272,924 B2
(45) Date of Patent: Apr. 30, 2019

(54) DETERMINING CONTROL CHARACTERISTICS FOR AN AUTONOMOUS DRIVING VEHICLE

(71) Applicant: Baidu USA LLC, Sunnyvale, CA (US)

(72) Inventors: Qi Luo, Sunnyvale, CA (US); Qi Kong, Sunnyvale, CA (US); Fan Zhu, Sunnyvale, CA (US); Sen Hu, Sunnyvale, CA (US); Xiang Yu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 177 days.

(21) Appl. No.: 15/383,843

(22) Filed: Dec. 19, 2016

(65) Prior Publication Data

US 2018/0170395 A1    Jun. 21, 2018

(51) Int. Cl.
| | | |
|---|---|---|
| *B60W 40/13* | (2012.01) | |
| *G01G 19/08* | (2006.01) | |
| *G05D 1/00* | (2006.01) | |
| *B60W 30/14* | (2006.01) | |

(52) U.S. Cl.
CPC ........... *B60W 40/13* (2013.01); *G01G 19/086* (2013.01); *G05D 1/0088* (2013.01); *B60W 30/143* (2013.01); *B60W 2710/0666* (2013.01); *B60W 2710/0672* (2013.01)

(58) Field of Classification Search
CPC ............................. G01G 19/08; G01G 19/086
See application file for complete search history.

(56) References Cited

U.S. PATENT DOCUMENTS

| | | | |
|---|---|---|---|
| 6,446,024 B1* | 9/2002 | Leimbach | B60T 8/172 702/141 |
| 7,363,116 B2* | 4/2008 | Flechtner | B60W 40/13 303/121 |
| 2013/0190945 A1* | 7/2013 | Koto | G01G 19/086 701/1 |
| 2018/0186381 A1* | 7/2018 | Erlien | G01G 19/086 |

FOREIGN PATENT DOCUMENTS

| | | |
|---|---|---|
| DE | 19728769 A1 | 1/1999 |
| DE | 19728867 A1 | 1/1999 |
| DE | 102007045998 A1 | 4/2009 |
| WO | 03/029764 A1 | 4/2003 |

* cited by examiner

*Primary Examiner* — Anshul Sood
(74) *Attorney, Agent, or Firm* — Womble Bond Dickinson (US) LLP

(57) ABSTRACT

Described is a system and method that provides the ability for an autonomous driving vehicle (ADV) to determine (or estimate) one or more control characteristics for the ADV. In order to determine these control characteristics, the system may perform one or more driving maneuvers such as an acceleration or deceleration maneuver, and a constant velocity maneuver. By performing these maneuvers using various known forces, the system may then perform various calculations to obtain one or more unknown characteristics. For example, the system may determine as estimated mass of the ADV, and as a result, adjust (or tune) various controls of the ADV based on the estimated mass.

20 Claims, 8 Drawing Sheets

Example Based on Driving Maneuvers A + B

1) A (e.g. acceleration maneuver) → Force$_{Tractive\ \#1}$ − Force$_{Resistive\ \#1}$ = Mass × Acceleration 701

2) B (e.g. constant velocity maneuver) → Force$_{Tractive\ \#2}$ − Force$_{Resistance\ \#1}$ = 0    702

3) A + B → Mass = Force$_{Tractive\ \#1}$ − Force$_{Tractive\ \#2}$ / Acceleration    703

DETERMINING CONTROL CHARACTERISTICS FOR AN AUTONOMOUS DRIVING VEHICLE

TECHNICAL FIELD

Embodiments of the present disclosure generally relate to operating an autonomous driving vehicle (ADV). More particularly, embodiments of the disclosure relate to determining control characteristics of an ADV.

BACKGROUND

Vehicles operating in an autonomous mode (e.g. driverless) can relieve the driver from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. When operating the ADV, a system may provide mechanisms that may require the system to gather information regarding various characteristics of the ADV. In some cases, these characteristics may be determined using various on-board sensors. However, in other instances, characteristics may not be known to the system. Moreover, this information may be required by the system in order to provide autonomous control mechanisms for the ADV. Accordingly, there is a need to provide the ability for an ADV to derive certain characteristics related to providing autonomous control.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

According to some embodiments, described is a system (and method) that provides the ability for an autonomous driving vehicle (ADV) to determine (or estimate) one or more control characteristics for the ADV. For example, these control characteristics may include information regarding characteristics of the ADV such as an estimated mass of the vehicle, or characteristics related to various physical forces required to maneuver the ADV. In order to determine these control characteristics, the system may perform one or more driving maneuvers or phases. In one embodiment, the driving maneuvers may include an acceleration or deceleration phase, and a constant velocity phase (e.g. no acceleration or deceleration). By performing these maneuvers using various known forces (e.g. engine drive torque), the system may then perform various calculations to obtain one or more unknown characteristics.

Accordingly, based on one or more of these determined characteristics, the system may initialize various ADV controls. For example, the system may adjust (or tune) the degree of throttle control under various load dynamics based on the information obtained during the initialization. In order to perform the processes described above, an ADV may include various processing components.

Figure 1:
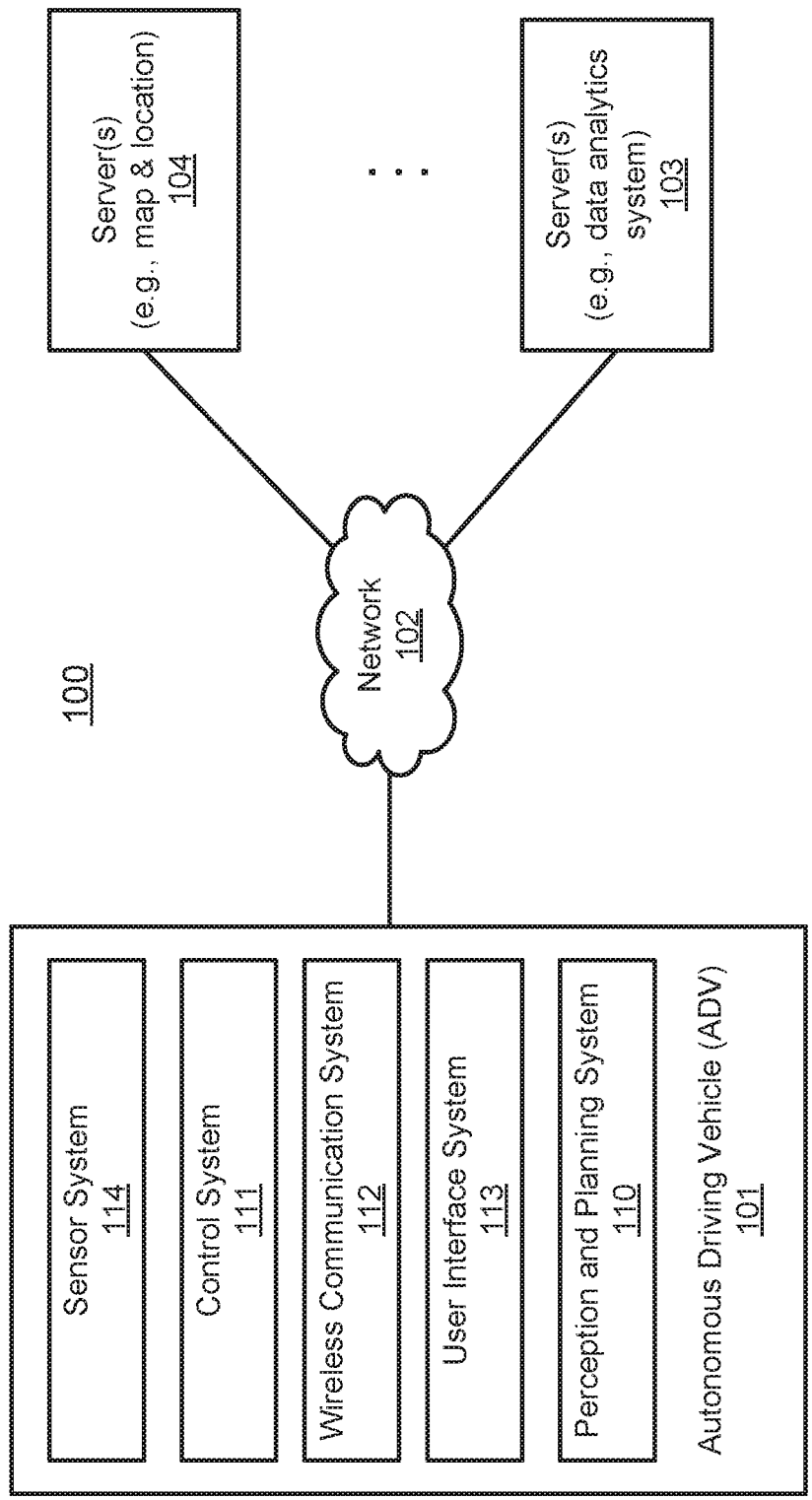
FIG. 1 is a block diagram illustrating an ADV configuration according to one embodiment of the disclosure

FIG. 1 is a block diagram illustrating an autonomous driving vehicle configuration according to one embodiment of the disclosure. The configuration 100 may include an ADV 101 that may be communicatively coupled to one or more servers 103-104 over a network 102. Although there is one ADV shown, multiple ADVs may be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to any type of vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, perception and planning system 110, vehicle control system 111, wireless communication system 112, user interface system 113, and sensor system 114. ADV 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-114 may be communicatively coupled to each other via an interconnect, a bus, a network, or a combination thereof. For example, components 110-114 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2A:
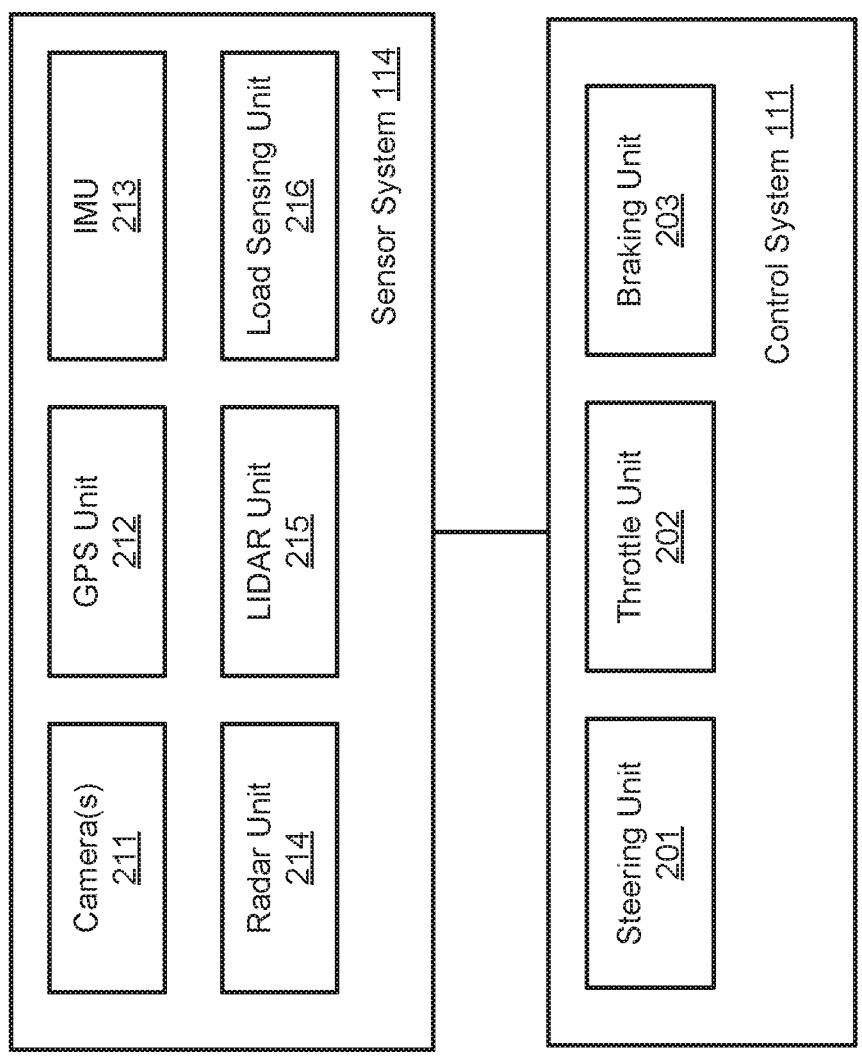
FIG. 2A is a block diagram illustrating an example of a sensor and control system used with the ADV according to one embodiment of the disclosure.

FIG. 2A is a block diagram illustrating an example of a sensor and control system according to one embodiment of the disclosure. In one embodiment, sensor system 114 includes, but it is not limited to, one or more cameras 211, global positioning system (GPS) unit 212, inertial measurement unit (IMU) 213, radar unit 214, a light detection and range (LIDAR) unit 215, and a load sensing unit 216. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Load sensing unit 216 may sense changes to various load characteristics (e.g. changes in weight/mass) of the ADV. The variations in load may be a result of carrying additional passengers and/or cargo (e.g. loading up a truck). As further described herein, various control adjustments to the ADV may be performed in response to detecting a change (e.g. increase or decrease) in these load characteristics.

Sensor system 114 may further include other sensors, such as a sonar sensor, an infrared sensor, a steering sensor, a throttle sensor, a braking sensor, and an audio sensor (e.g. microphone). A throttle sensor and a braking sensor may sense the throttle position and braking position of the vehicle, respectively. In addition, these sensors may measure or determine various forces as further described herein. For example, a throttle sensor may measure an amount of engine drive torque required to propel the ADV, and a braking sensor may measure the amount of braking torque required to stop the ADV. In some situations, a throttle sensor and a braking sensor may be integrated as an integrated throttle/braking sensor. A steering sensor may be configured to sense the steering angle of a steering wheel, wheels of the vehicle, or a combination thereof.

In one embodiment, vehicle control system 111 includes, but is not limited to, steering unit 201, throttle unit 202 (also referred to as an acceleration unit), and braking unit 203. Steering unit 201 may adjust the direction or heading of the vehicle. Throttle unit 202 may control the speed of the motor or engine that in turn control the speed and acceleration of the vehicle. For example, throttle unit 202 may control the amount of drive torque produced by the engine (or motor) as further described herein. As referred to herein, the engine may include an engine or motor such as a combustion engine, an electric motor, or a hybrid-type engine. Braking unit 203 may decelerate the vehicle by providing friction to slow the wheels or tires of the vehicle. For example, the braking unit 203 may provide a braking torque to provide such deceleration. Accordingly, a driving maneuver may include any driving actions performed by the autonomous vehicle 101, for example, by using one, or a combination, of the steering unit 201, throttle unit 202, and braking unit 203.

Referring back to FIG. 1, wireless communication system 112 may allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 may include the necessary hardware (e.g., processor(s), memory, storage) and software (e.g., operating system, planning and routing programs) to receive information from sensor system 114, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, and location information, as well as real-time local environment data detected or sensed by sensor system 114 (e.g., obstacles, objects, nearby vehicles), perception and planning system 110 can plan an optimal route and drive vehicle 101, for example, via control system 111, according to the planned route to reach the specified destination safely and efficiently.

The perception and planning system 110 may perceive information related to what an ordinary driver would perceive surrounding a vehicle in which the driver is driving. The perception information can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Figure 2B:
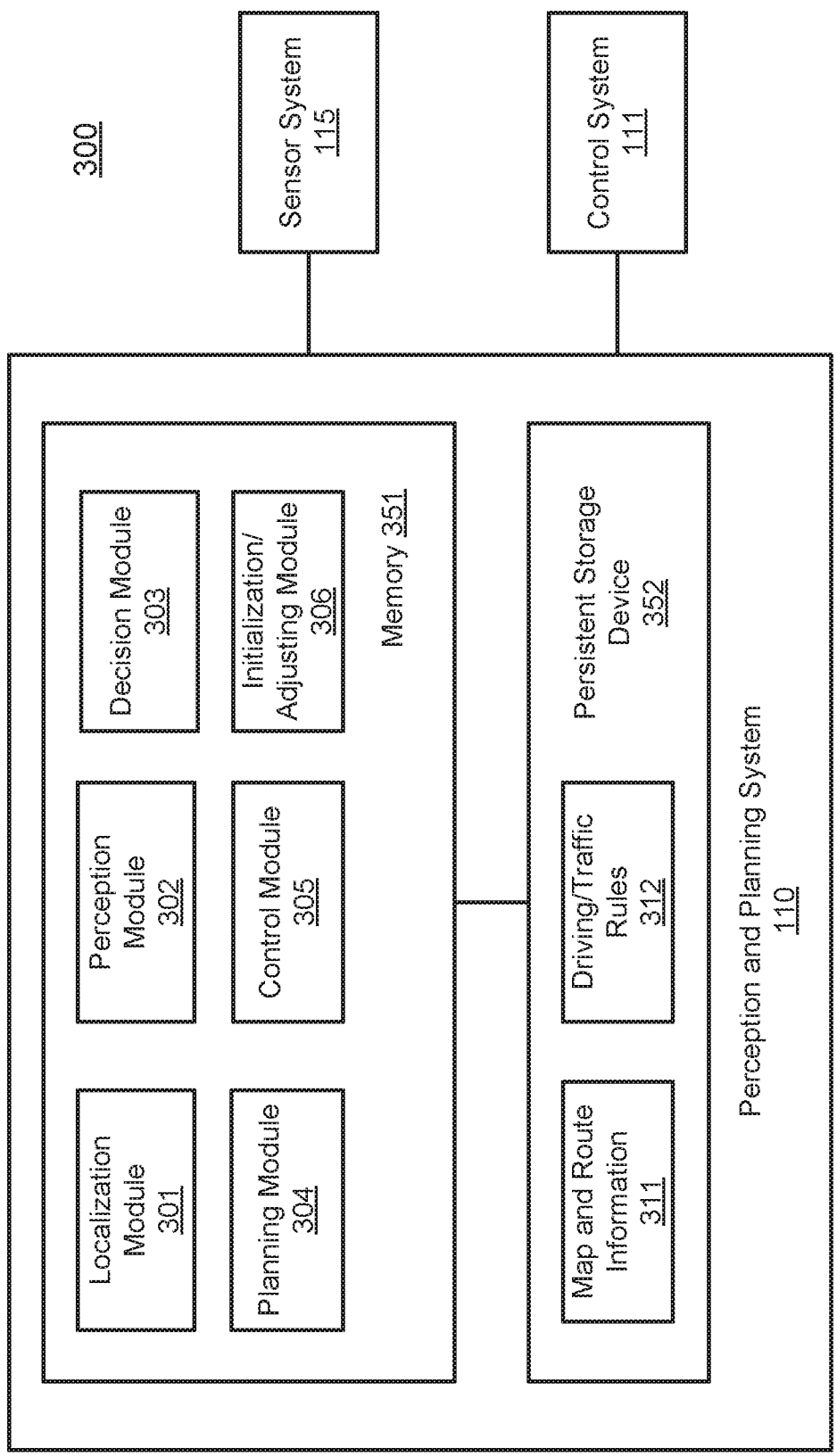
FIG. 2B is a block diagram illustrating an example of a perception and planning system used with the ADV according to one embodiment of the disclosure.

FIG. 2B is a block diagram illustrating an example of a perception and planning system used with an ADV according to one embodiment of the disclosure. System 300 may be implemented as a part of configuration 100 including, but is not limited to, perception and planning system 110, control system 111, and sensor system 114. As shown, the perception and planning system 110 includes, but is not limited to, localization module 301, perception module 302, decision module 303, planning module 304, control module 305, and initialization/adjusting unit 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2A. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data.

Based on the sensor data provided by sensor system 114 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Initialization/adjusting module 306 may initialize (e.g. tune) various control components including the units of the control system described above. In addition, as further described herein, the initialization/adjusting module 306 may adjust (or readjust, recalibrate, tune, etc.) one or more components in response to various changes to the characteristics of the ADV. For example, the initialization/adjusting module 306 may adjust a throttle control rate in response to detecting changes to the mass of the ADV.

Note that some or all of the components as shown and described above (e.g. in FIGS. 1, 2A, 2B) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 3:
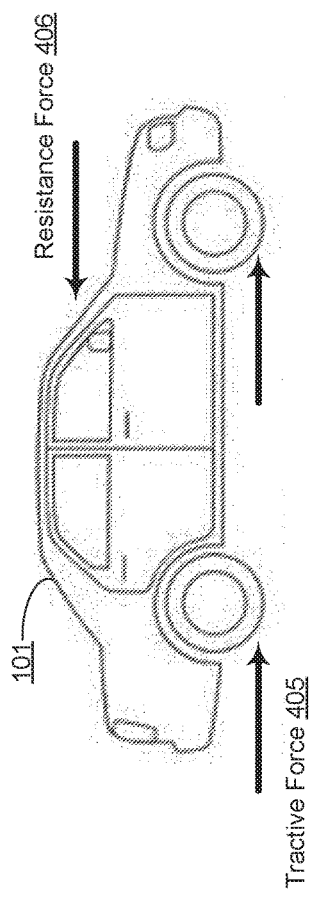
FIG. 3 is a diagram illustrating a general overview of the forces acting upon the ADV that may be considered by the system according to one embodiment of the disclosure.

FIG. 3 is a diagram illustrating a general overview of the forces acting upon the ADV that may be considered by the system according to one embodiment of the disclosure. As shown, the ADV 101 may generate a tractive force 405. In general, the tractive force 405 may include the traction the ADV exerts on a surface, which may be parallel to the direction of travel. In addition, a resistance force 406 may act in a direction opposite the direction of travel. For example, the resistance force 406 may include a drag force (e.g. air resistance), friction force (e.g. friction force between the wheels and the road surface), the force of gravity, and various other forces that may act (or resist) the direction of travel. When accelerating or decelerating the ADV, various forces may act upon the wheel of the ADV.

Figure 4:
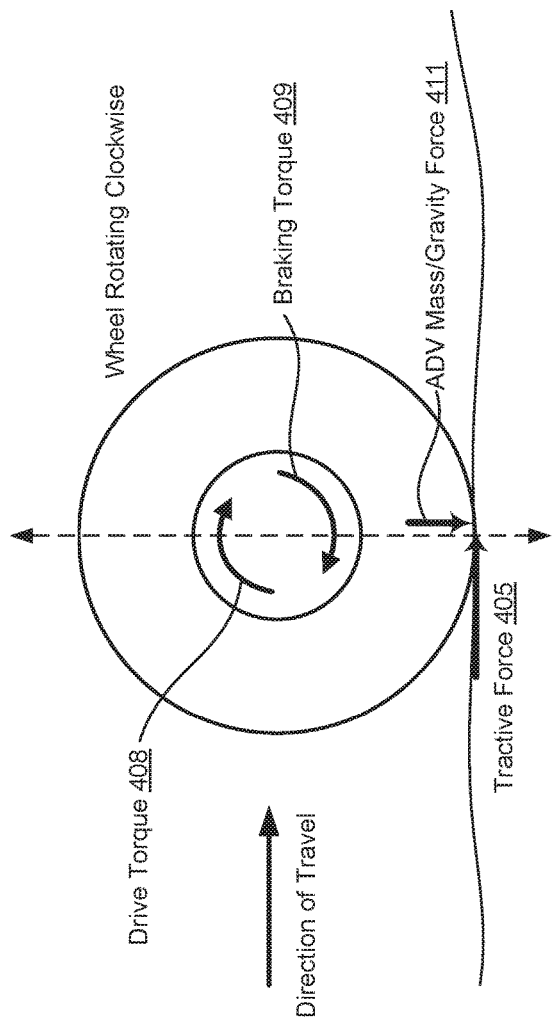
FIG. 4 is a diagram illustrating the forces acting upon the wheel of the ADV that may be considered by the system according to one embodiment of the disclosure.

FIG. 4 is a diagram illustrating the forces acting upon the wheel of the ADV that may be considered by the system according to one embodiment of the disclosure.

As shown, a drive torque 408 may rotate the wheel in the direction of travel and generate the tractive force 405. Accordingly, the tractive force 405 may be a force that is measurable by the system based on the generated drive torque 408 produced, for example, by an engine to accelerate the ADV. In order to stop the vehicle, the ADV may also generate a braking torque 409. Accordingly, the braking torque 409 may also be known (e.g. measureable) by the system and used to determine various unknown control characteristics as further described herein. In addition, as shown, an ADV mass/gravity force 411 may also act upon the wheel.

Figure 5:
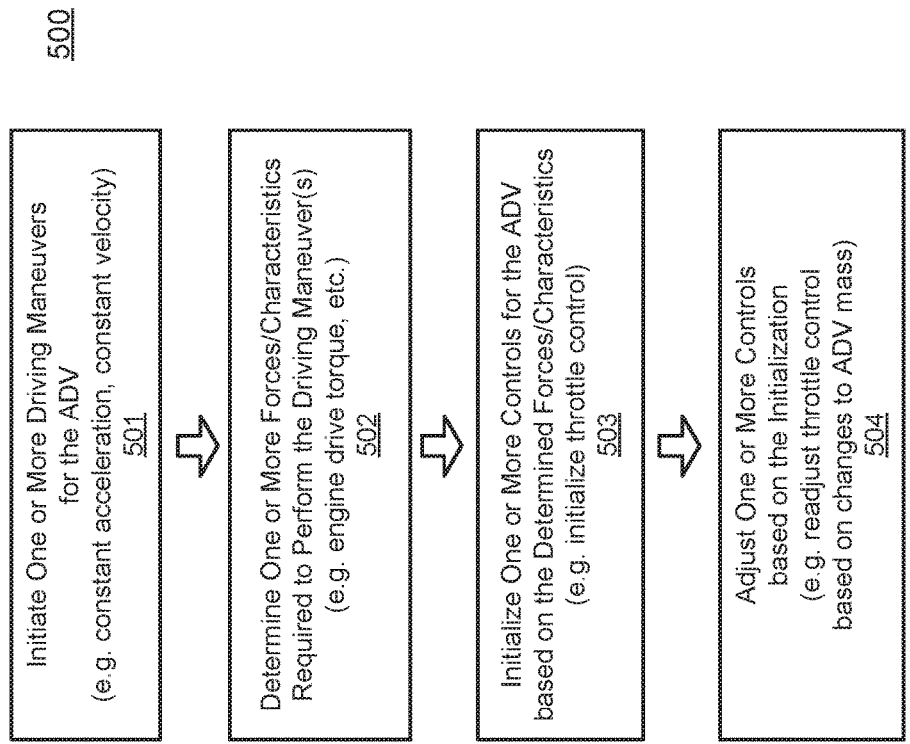
FIG. 5 is a process overview illustrating an example of determining characteristics of an ADV according to one embodiment of the disclosure.

FIG. 5 is a process flow diagram illustrating an example of determining characteristics of an ADV according to one embodiment of the disclosure. Process 500 may use processing logic that may include software, hardware, or a combination thereof. For example, process 500 may be performed by a system (e.g. one or more components of configuration 100).

In block 501, the system may initiate one or more driving maneuvers. These maneuvers may include driving the ADV under various controls. For example, a driving maneuver may include utilizing one or more controls to affect the throttle, braking, steering, etc. of the ADV (e.g. via control system 111). In some embodiments, the maneuvers may include accelerating, decelerating, or maintaining a constant velocity (e.g. no acceleration/deceleration) of the ADV.

Figures 6, 7:
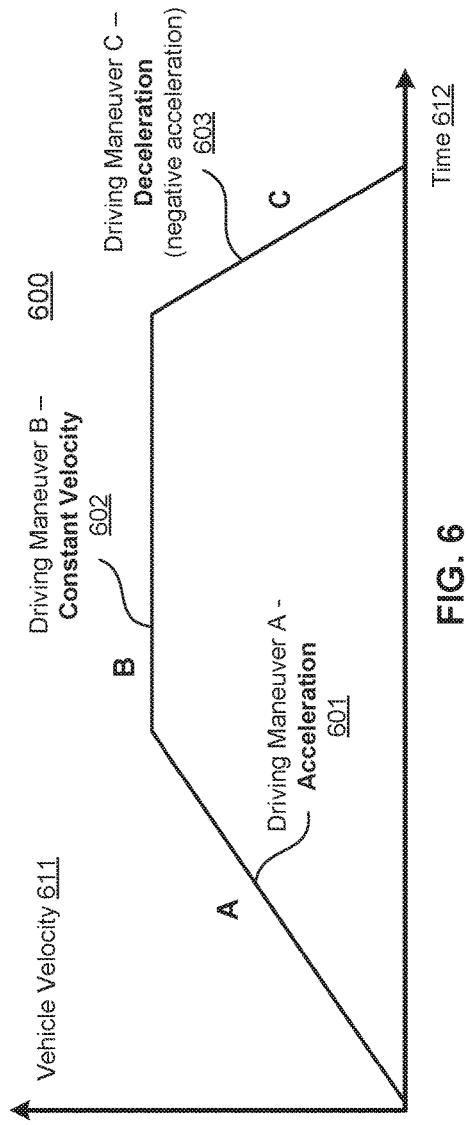
FIG. 6 shows an example chart illustrating the acceleration of the ADV during various driving maneuvers according to one embodiment of the disclosure.
FIG. 7 shows an example of formulas that may be used to determine one or more control characteristics for the ADV according to one embodiment of the disclosure.

FIG. 6 shows an example chart illustrating the acceleration of the ADV during various driving maneuvers according to one embodiment of the disclosure. As shown, the chart 600 shows the vehicle velocity 611 across a period of time 612.

As shown, during driving maneuver A 601, the system may accelerate the ADV. For example, the acceleration may be archive under a throttle control. In one embodiment, the acceleration may be constant as shown in this example. In one embodiment, the acceleration may occur at a sufficiently low velocity such that a drag resistance (or air resistance) does not affect calculations as further described herein. For example, the drag resistance at a lower rate of acceleration may be negligible for the calculations of determining an ADV mass as described herein.

During driving maneuver B 602, the system may maintain a constant velocity of the ADV. Accordingly, as further described herein, the system may assume certain characteristics during this phase, and accordingly, calculate additional information that may initially be unknown. In one embodiment, the system may determine the force of resistance equates to the force of traction. For example, in one embodiment, this assumption may be based on driving maneuver B being performed at a sufficiently low velocity such that the drag resistance does not affect calculations described herein. It should be noted, however, that in some embodiments, the driving maneuvers may be performed at various velocities and the system may account for (e.g. measure) a drag resistance, which may be taken into account during various calculations.

During driving maneuver C 603, the system may decelerate the ADV. For example, the deceleration may be achieved under a braking control. In another example, the deceleration may be performed by performing a down-shifting (or "engine braking") of the ADV, or a combination of braking and down-shifting. Accordingly, in some embodiments, driving maneuver C may provide information similar to that provided in driving maneuver A.

As further described herein, the system may perform one or more of these maneuvers (e.g. maneuvers A-C) as a first and second driving maneuver (or phase). For example, in one embodiment, the system may perform maneuvers A and B as a first and second phase respectively. In another embodiment, the system may perform maneuvers B and C as a first and second phase respectively. In addition, one in embodiment, the system may perform at least one acceleration (or negative acceleration or deceleration) maneuver (e.g. maneuver A or C) along with a constant velocity maneuver (e.g. maneuver B). It should also be noted that these maneuvers may be performed in various orders (e.g. acceleration/deceleration followed by constant velocity, or vice-versa). It should also be noted that that maneuvers described above may typically be performed while driving in a substantially straight line, but these maneuvers may also be performed under various steering conditions and the system may account for such steering controls. In addition, the maneuvers described above, may be performed in a fully, or partially autonomous modes as described above.

Returning to FIG. 5, in block 502, the system may determine one or more forces required, measured, or calculated under the one or more driving maneuvers. For example, the system may determine various forces as shown, for example, in FIGS. 3 and 4. These forces may include a first tractive force required by the ADV to achieve the acceleration (e.g. during maneuver A) and a second tractive force required by the ADV to maintain the constant velocity (e.g. during driving maneuver B). Based on these determined forces, the system may determine one or more additional characteristics using various formulas (e.g. mass of the ADV).

FIG. 7 shows an example of formulas that may be used to determine one or more control characteristics for the ADV according to one embodiment of the disclosure. As described, various information (e.g. forces or characteristics) related to the ADV may be derived by performing one or more driving maneuvers. This information may be determined based on using the general equation of Force= (Mass)×(Acceleration) (e.g. Newton's second law). As shown, the system may use this formula as a basis for calculating various unknown information from known information. For example, during an acceleration maneuver (e.g. driving maneuver A 601 or driving maneuver C 603), the system may apply the formula 701, which may describe a force required to accelerate (or decelerate) the ADV. This force may also be described as equating to the tractive force (e.g. tractive force 405) minus the resistance force (e.g. resistance force 406).

The tractive force 405 may be a known force that may be measured or determined based on the engine drive torque (e.g. drive torque 408) required by, for example, the engine to accelerate or propel the ADV in the direction travel as described above. In another example, the tractive force 405 may be measured by one or sensors that may be coupled to an engine or wheel(s) of the ADV. In yet another example, the tractive force 405 may be measured by an inertial measurement unit (IMU) (e.g. IMU 213). The above example may also apply during a negative acceleration (e.g. during braking), and accordingly, the braking torque (e.g. braking torque 409) may also be measured to determine a force during driving maneuver C.

In order to determine unknown characteristics, for example, related to the mass of the ADV, the system may perform various calculations. As shown in 702, based on the property of constant velocity (e.g. no positive or negative acceleration), the system may determine the second tractive force required to maintain the constant acceleration (e.g. no acceleration) is substantially equal to the opposing resistance force (e.g. resistance force 406). Accordingly, a previous unknown characteristic (e.g. resistance force 406) may now be determined from based on the information from a first and second driving maneuver (e.g. maneuvers A+B). Accordingly, this known force may be used to perform additional calculations. For example, the system may then calculate or determine (e.g. solve) various unknown characteristics based on the newly determined second tractive force. For example, the system may determine an estimated mass of the ADV based on the determined first tractive force, the determined second tractive force, and a rate of the acceleration during the first driving maneuver. For instance, as shown in 703, the mass may equal the first tractive force minus the second tractive force, which is then divided by the acceleration.

As an example scenario, if a single passenger is in the ADV and the system performs maneuver A with an acceleration of 1 m/s$^2$ that requires a first tractive force of 1900 N, and then performs maneuver B, which requires a second tractive force of 200 N, the system may calculate the mass of the ADV with the single passenger as 1700 kg. Similarly, in another scenario with three passengers, if the system determines that it requires a first tractive force of 2100 N to accelerate the ADV at 1 m/s$^2$ (e.g. maneuver A), and a second tractive force of 230 N to maintain a constant velocity (e.g. maneuver B), the system may calculate the mass of the ADV with the three passengers as 1870 kg. In addition, the system may measure the amount of throttle control (or rate, or ratio) that is required for each of these scenarios. Accordingly, the throttle control rate or ratio may be adjusted based on various load configurations (e.g. various masses for the ADV). It should be noted, that in addition to determining the mass using driving maneuvers A and B as described above, these formulas may also be used for driving maneuvers B and C.

Once again returning to FIG. 5, in block 503, the system may initialize one or more controls of the ADV based on the information derived as described above. In one embodiment, initiating first and second driving maneuvers may be performed as part of an initialization process for one or more controls of the ADV. For example, the initialization process may be performed for a throttle control rate that controls an output of the drive torque produced by the engine to accelerate the ADV.

In block 504, the system may adjust one or more controls based on the initialization of 503. Accordingly, the system may adjust the throttle control rate of the control system based on the calculated tractive force requirements determined above. In one embodiment, the system may adjust or tune an automatic gain function for a throttle control. In one embodiment, the acceleration (or throttle control) of the ADV may be provided by a proportional-integral-derivative controller (PID controller). Accordingly, the PID may be tuned based on an estimated mass of the ADV.

When determining the throttle control rate, the system may determine a throttle control ratio with the calculated tractive force requirement and the estimated mass during the first set of load characteristics. In one embodiment, initiating the first and second driving maneuvers may be performed during a first set of load characteristics for the ADV, and accordingly, the estimated mass may be determined for the first set of load characteristics. Accordingly, when the system detects a change from the first set of load characteristics to a second set of load characteristics for the ADV, the system may readjust the throttle control rate based on the determined throttle control ratio and the estimated mass during the second set of load characteristics.

As an example, scenario, if the tractive force required to accelerate an ADV with a mass of 1500 kg is 2000 N, and it takes a throttle control rate of 50% as the ratio, the system may determine that when the mass is 2000 kg, it will take a throttle control rate of 100% to provide the required 4000 N as the tractive force.

Figure 8:
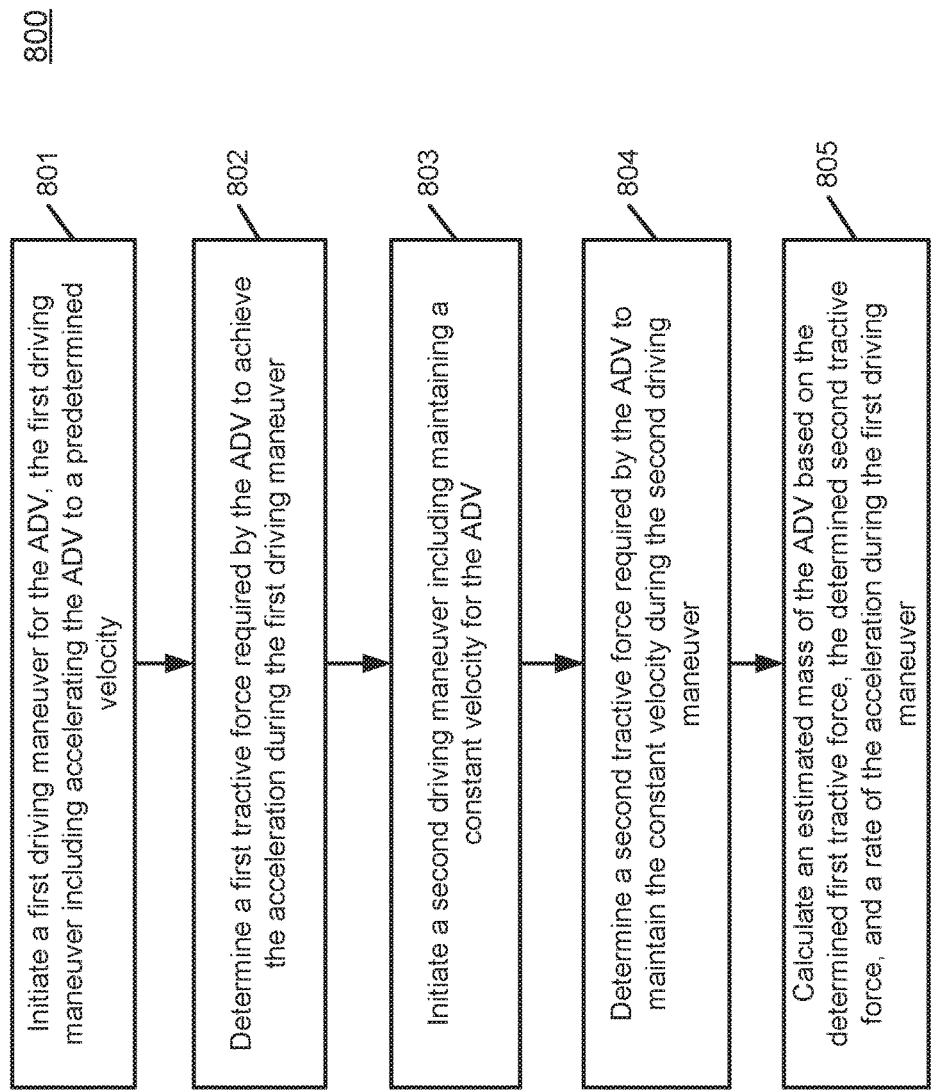
FIG. 8 is an example flow diagram illustrating a method of determining one or more control characteristics for the ADV according to one embodiment of the disclosure.

FIG. 8 is an example flow diagram illustrating a method of determining one or more control characteristics for the ADV according to one embodiment of the disclosure. Process (or method) 800 may use processing logic that may include software, hardware, or a combination thereof. For example, process 800 may be performed by a system including one or more components of configuration 100.

In 801, the system may initiate, for example by a control system of the ADV, a first driving maneuver for the ADV. In one embodiment, the first driving maneuver may include accelerating the ADV to a predetermined velocity (e.g. driving maneuver A 601). In one embodiment, accelerating the ADV to the predetermined velocity may include a substantially constant acceleration. In 802, the system may determine a first tractive force (e.g. tractive force 405) required by the ADV to achieve the acceleration during the first driving maneuver.

In 803, the system may initiate a second driving maneuver including maintaining a constant velocity for the ADV (e.g. driving maneuver B 602). In one embodiment, the system may initiate a second driving maneuver in response to reaching the predetermined velocity achieved from the first driving maneuver. In one embodiment, each of the first and second tractive forces may correspond to a drive torque (e.g. drive torque 408) produced by an engine of the ADV. In one embodiment, at least one of the first driving maneuver and the second driving maneuver are performed autonomously by the ADV.

In 804, the system may determine a second tractive force required by the ADV to maintain the constant velocity during the second driving maneuver. In one embodiment, the second tractive force is determined as being substantially equal to the resistance force during the second driving maneuver as a result of the ADV travelling at the predetermined velocity during the second driving maneuver. As described above, in one embodiment, the predetermined velocity is selected such that a drag force component of the resistance force is minimal or substantially constant during the first and second driving maneuvers.

In 805, the system may calculate an estimated mass of the ADV based on the determined first tractive force, the determined second tractive force, and a rate of the acceleration during the first driving maneuver. In one embodiment, the calculation may also be based on the rate of acceleration during the first and second driving maneuvers.

It should be noted that in addition to a mass of the ADV, other characteristics such as force (or inertial force) may be determined. For example, the system may calculate an inertial force required to accelerate the ADV based on the resistance force, the rate of the acceleration, and the estimated mass of the ADV, etc. In addition, other characteristics such as acceleration, first or second tractive forces, resistance forces, may also be determined based on using or manipulating the formulas described above. Accordingly, embodiments of the system described above provide a technique to derive control characteristics related to the autonomous control of the ADV.

Figure 9:
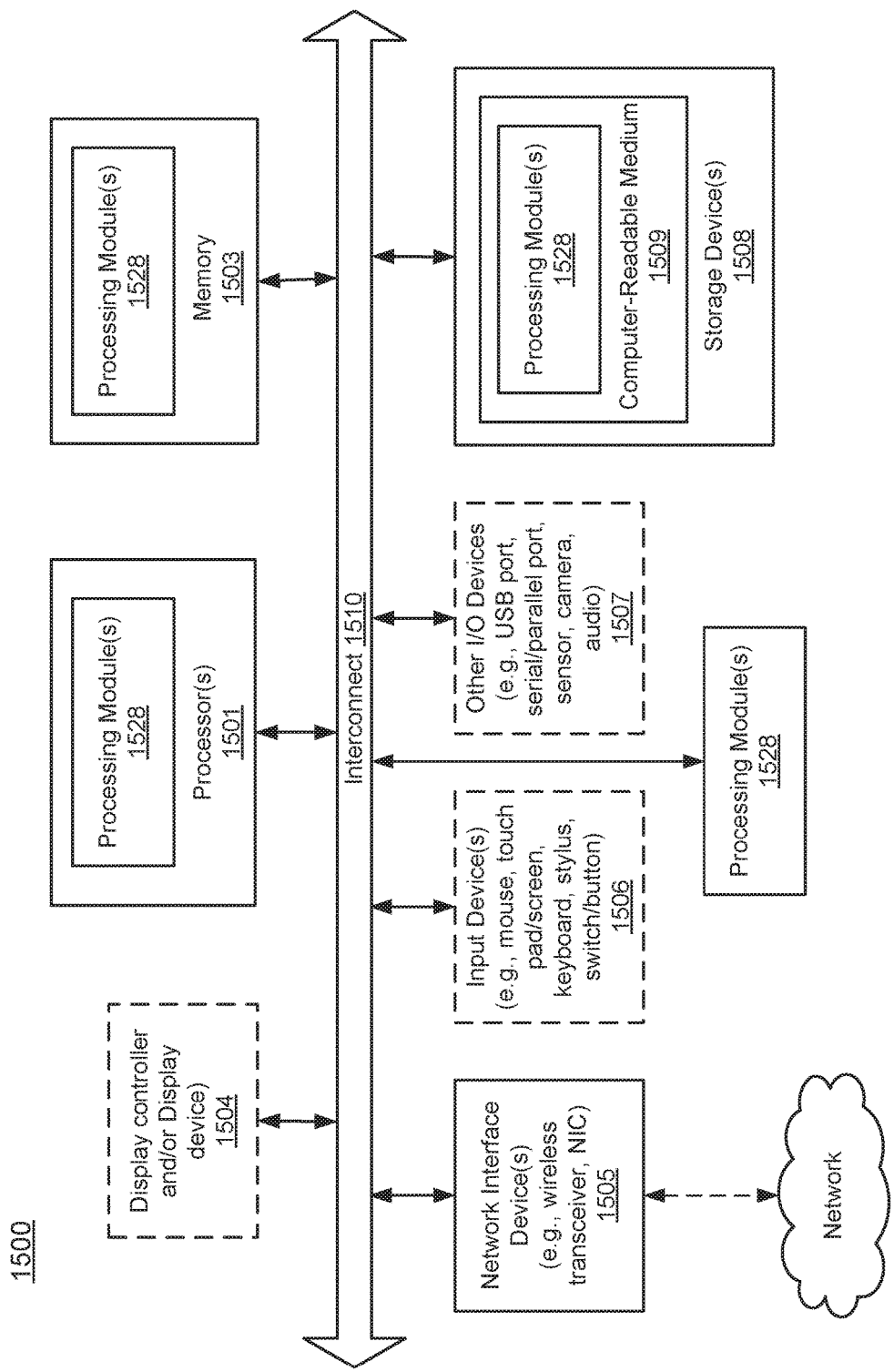
FIG. 9 is a block diagram illustrating an example computing system that may be used in conjunction with one or more embodiments of the disclosure.

FIG. 9 is a block diagram illustrating an example computing system that may be used in conjunction with one or more embodiments of the disclosure.

For example, system 1500 may represent any of data processing systems described above performing any of the processes or methods described above, such as, for example, one or more components shown in configuration 100 (e.g. components 110-114) of the autonomous vehicle 101, or servers 103-104 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). For example, vehicle 101 may include an internal electronic display. In this regard, internal electronic display may be located within a cabin of vehicle. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein.

Processing modules 1528 (or component/unit/logic) may represent any of the components described above, such as, for example, decision system 110, sensor system 114, and control system 111 (and related modules and sub-modules). Processing modules 1528 may also reside, completely or at least partially, within memory 1503 and/or within processor 1501 during execution thereof by data processing system 1500, memory 1503, and processor 150, which may also constitute a machine-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially. The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of determining characteristics of an autonomous driving vehicle (ADV), comprising:
    initiating a first driving maneuver for the ADV, the first driving maneuver including accelerating the ADV to a predetermined velocity;
    determining a first tractive force required by the ADV to achieve the acceleration during the first driving maneuver;
    in response to reaching the predetermined velocity, initiating a second driving maneuver including maintaining a constant velocity for the ADV;
    determining a second tractive force required by the ADV to maintain the constant velocity during the second driving maneuver;
    calculating an estimated mass of the ADV based on the determined first tractive force, the determined second tractive force, and a rate of the acceleration during the first driving maneuver, wherein initiating the first and second driving maneuvers are performed during a first set of load characteristics for the ADV;
    detecting a change from the first set of load characteristics to second set of load characteristics for the ADV; and
    in response to detecting the change from the first set of load characteristics to the second set of load characteristics for the ADV, determining an updated estimated mass of the ADV for the second set of load characteristics different from the first set of load characteristics.

2. The method of claim 1, wherein the estimated mass is determined for the first set of load characteristics of the ADV.

3. The method of claim 2, wherein each of the first and second tractive forces correspond to a drive torque produced by an engine of the ADV.

4. The method of claim 3, wherein initiating the first and second driving maneuvers are performed as part of an initialization process for a throttle control rate that controls an output of the drive torque produced by the engine.

5. The method of claim 4, wherein the initialization process for the throttle control rate includes determining a throttle control ratio based on the estimated mass for the first set of load characteristics.

6. The method of claim 5, further comprising:
    adjusting the throttle control rate based on the determined throttle control ratio with the updated estimated mass during the second set of load characteristics.

7. The method of claim 6, wherein the first or the second set of load characteristics include a number of passengers or a passenger load within the ADV.

8. The method of claim 1, wherein accelerating the ADV to the predetermined velocity comprises a substantially constant acceleration.

9. The method of claim 1, wherein the predetermined velocity or the acceleration is selected such that a drag force component of a resistance force is minimal or substantially constant during the first and second driving maneuvers.

10. The method of claim 1, wherein the second tractive force is determined as being substantially equal to a resistance force during the second driving maneuver as a result of the ADV travelling at the predetermined velocity during the second driving maneuver.

11. The method of claim 1, wherein at least one of the first driving maneuver and the second driving maneuver are performed autonomously by the ADV.

12. A non-transitory machine-readable medium having instructions stored therein, which when executed by a processor coupled to an autonomous driving vehicle (ADV), cause the processor to perform operations, the operations comprising:
 initiating a first driving maneuver for the ADV, the first driving maneuver including accelerating or decelerating the ADV to a predetermined velocity;
 determining a first tractive force required by the ADV to achieve the acceleration or deceleration during the first driving maneuver;
 initiating a second driving maneuver including maintaining a constant velocity for the ADV;
 determining a second tractive force required by the ADV to maintain the constant velocity during the second driving maneuver;
 calculating an estimated mass of the ADV based on the determined first tractive force, the determined second tractive force, and a rate of the acceleration or deceleration during the first driving maneuver, wherein the estimated mass is determined for a first set of load characteristics of the ADV;
 detecting a change from the first set of load characteristics to a second set of load characteristics for the ADV; and
 in response to detecting the change from the first set of load characteristics to the second set of load characteristics for the ADV, determining an updated estimated mass of the ADV for the second set of load characteristics different from the first set of load characteristics.

13. The medium of claim 12, the operations further comprising adjusting a throttle control rate based on the estimated mass, wherein the throttle control rate controls an output of a drive torque produced by an engine of the ADV.

14. The medium of claim 13, wherein initiating the first and second driving maneuvers are performed as part of an initialization process for the throttle control rate.

15. The medium of claim 14, wherein the initialization process for the throttle control rate includes determining a throttle control ratio with the estimated mass during the first set of load characteristics.

16. The medium of claim 15, the operations further comprising:
 adjusting the throttle control rate based on the determined throttle control ratio with the updated estimated mass during the second set of load characteristics.

17. A control system for an autonomous driving vehicle (ADV), comprising:
 a processor; and
 a memory coupled to the processor to store instructions, which when executed by the processor, cause the processor to perform operations, the operations including:
  initiating a first driving maneuver for the ADV, the first driving maneuver including accelerating the ADV to a predetermined velocity,
  determining a first tractive force required by the ADV to achieve the acceleration during the first driving maneuver,
  initiating a second driving maneuver including maintaining a constant velocity for the ADV,
  determining a second tractive force required by the ADV to maintain the constant velocity during the second driving maneuver,
  calculating an estimated mass of the ADV based on the determined first tractive force, the determined second tractive force, and a rate of the acceleration during the first driving maneuver, wherein initiating the first and second driving maneuvers are performed during a first set of load characteristics for the ADV;
  detecting a change from the first set of load characteristics to a second set of load characteristics for the ADV; and
  in response to detecting the change from e first set of load characteristics to the second set of load characteristics for the ADV, determining an updated estimated mass of the ADV for the second set of load characteristics different from the first set of load characteristics.

18. The system of claim 17, the operations further comprising adjusting a throttle control rate based on the estimated mass, wherein the throttle control rate controls an output of a drive torque produced by an engine of the ADV.

19. The system of claim 18, wherein initiating the first and second driving maneuvers are performed as part of an initialization process for the throttle control rate.

20. The system of claim 19, the operations further comprising:
 readjusting the throttle control rate based on the updated estimated mass during the second set of load characteristics.

* * * * *